United States Patent [19]
Mackay et al.

[11] Patent Number: 6,165,431
[45] Date of Patent: Dec. 26, 2000

[54] METHODS FOR SEPARATING OXYGEN FROM OXYGEN-CONTAINING GASES

[75] Inventors: Richard Mackay, Lafayette; Michael Schwartz; Anthony F. Sammells, both of Boulder, all of Colo.

[73] Assignee: Eltron Research, Inc., Boulder, Colo.

[21] Appl. No.: 09/286,829

[22] Filed: Apr. 6, 1999

Related U.S. Application Data

[63] Continuation-in-part of application No. 08/639,781, Apr. 29, 1996, Pat. No. 6,033,632, which is a continuation-in-part of application No. 08/163,620, Dec. 8, 1993, abandoned.

[51] Int. Cl.[7] .......................... B01D 53/22; C01B 13/00
[52] U.S. Cl. ............................. 423/219; 502/4; 96/4; 95/54; 55/524
[58] Field of Search ..................... 423/219; 502/4; 96/4; 95/54; 55/524

[56] References Cited

U.S. PATENT DOCUMENTS

| | | | |
|---|---|---|---|
| 3,607,863 | 9/1971 | Dosch | 260/209 |
| 3,754,951 | 8/1973 | Coatney | 106/58 |
| 4,083,730 | 4/1978 | Kwech et al. | 106/89 |
| 4,330,633 | 5/1982 | Yoshisato et al. | 501/152 |
| 4,791,079 | 12/1988 | Hazbun | 504/4 |
| 4,793,904 | 12/1988 | Mazanec et al. | 204/59 |
| 4,802,958 | 2/1989 | Mazanec et al. | 204/80 |

(List continued on next page.)

FOREIGN PATENT DOCUMENTS

| | | |
|---|---|---|
| 399 833 A1 | 11/1990 | European Pat. Off. . |
| 673 675 A2 | 9/1995 | European Pat. Off. . |
| 705 790 A1 | 4/1996 | European Pat. Off. . |
| 766 330 A1 | 4/1997 | European Pat. Off. . |
| 438 902 B1 | 5/1997 | European Pat. Off. . |
| 2203446 | 10/1988 | United Kingdom . |
| 94/24065 | 10/1994 | WIPO . |
| 97/41060 | 11/1997 | WIPO . |

OTHER PUBLICATIONS

Teraoka et al. (1988) Mat. Res. Bull. 23:51–58.
Teraoka et al. (1985) Chem. Lett. 1743–1746, The Chemical Society of Japan.
Teraoka et al. (1988) Chem. Lett. 503–506, The Chemical Society of Japan.
Matsumoto et al. (1980) J. Electrochem. Soc. 127(11):2360–2364.
Goodenough et al. (1990) Solid State Ionics 44:21–31.
Zhen, Y.S. and Goodenough, J.B. (1990) Mat. Res. Bull. 25:785–790.
Gallagher et al. (1964) J. Chem. Phys. 41(8):2429–2434.
Greaves et al. (1975) Acta Cryst. B31:641–646.
Sammells et al. (1992) Solid State Ionics 52:111–123.
Cook, R.L. and Sammells, A.F. (1991) Solid State Ionics 45:311–321.
Cook et al. (1990) J. Electrochem. Soc. 137:3309–3310.
Teraoka et al. (1985) Chem. Lett. 1367–1370.
Crespin, M. and Hall, K.W. (1981) J. Catal. 69:359–370.
Chick et al. (1990)Mater. Lett. 10(1,2):6–12.
Pederson et al. (1991) Mater. Lett. 10(9,10):437–443.
van der Pauw (1958) Philips Res. Rep. 13(1):1–9.
Rostrup–Nielson, J.R. and Bak Hansen, J.–H. (1993) J. Catalysis 144:38–49.
Sammells, T., (1991), "Rational Selection of Perovskites for Solid Electrolytes and Electrocatalysis," Presented at BP America Research, Warrenville Research Center, Sep. 16, 1991, 46pp.
Pujare, N U and Sammells, A.F. (1988) J. Electrochem. Soc. 135(10):2544–2545.
Shin, S. and Yonemura, M. (1978) Mat. Res. Bull. 13:1017–1021.

(List continued on next page.)

*Primary Examiner*—Steven P. Griffin
*Assistant Examiner*—Timothy C Vanoy
*Attorney, Agent, or Firm*—Greenlee, Winner and Sullivan, P.C.

[57] ABSTRACT

This invention provides mixed conducting metal oxides particularly useful for the manufacture of catalytic membranes for gas-phase oxygen separation processes. The materials of this invention have the general formula:

$$A_x A'_{x'} A''_{2-(x+x')} B_y B'_{y'} B''_{2-(y+y')} O_{5+z};$$

where x and x' are greater than 0;

y and y' are greater than 0;

x+x' is less than or equal to 2;

y+y' is less than or equal to 2;

z is a number that makes the metal oxide charge neutral;

A is an element selected from the f block lanthanide elements; A' is an element selected from Be, Mg, Ca, Sr, Ba and Ra;

A" is an element selected from the f block lanthanides or Be, Mg, Ca, Sr, Ba and Ra; B is an element selected from the group consisting of Al, Ga, In or mixtures thereof; and B' and B" are different elements and are independently selected from the group of elements Mg or the d-block transition elements.

The invention also provides methods for oxygen separation and oxygen enrichment of oxygen deficient gases which employ mixed conducting metal oxides of the above formula. Examples of the materials used for the preparation of the membrane include $$A_x Sr_{x'} B_y Fe_{y'} Co_{2-(y+y')} O_{5+z},$$

where x is about 0.3 to about 0.5, x' is about 1.5 to about 1.7, y is 0.6, y' is between about 1.0 and 1.4 and B is Ga or Al.

26 Claims, 7 Drawing Sheets

U.S. PATENT DOCUMENTS

| | | | |
|---|---|---|---|
| 4,827,071 | 5/1989 | Hazbun | 585/443 |
| 4,933,054 | 6/1990 | Mazanec et al. | 204/80 |
| 5,160,618 | 11/1992 | Burggraaf et al. | 210/500.25 |
| 5,160,713 | 11/1992 | Mazanec et al. | 423/210 |
| 5,210,059 | 5/1993 | Matturo et al. | 502/4 |
| 5,240,473 | 8/1993 | Carolan et al. | 95/54 |
| 5,240,480 | 8/1993 | Thorogood et al. | 96/4 |
| 5,306,411 | 4/1994 | Mazanec et al. | 204/266 |
| 5,356,728 | 10/1994 | Balachandran et al. | 429/8 |
| 5,366,712 | 11/1994 | Violante et al. | 423/248 |
| 5,393,325 | 2/1995 | Edlund | 95/56 |
| 5,397,541 | 3/1995 | Post | 422/88 |
| 5,430,209 | 7/1995 | Agaskar et al. | 585/315 |
| 5,466,646 | 11/1995 | Moser | 502/60 |
| 5,534,471 | 7/1996 | Carolan et al. | 502/4 |
| 5,569,633 | 10/1996 | Carolan et al. | 502/4 |
| 5,591,315 | 1/1997 | Mazanec et al. | 205/462 |
| 5,639,437 | 6/1997 | Balachandran et al. | 423/593 |
| 5,648,304 | 7/1997 | Mazanec et al. | 501/134 |
| 5,693,212 | 12/1997 | Mazanec et al. | 205/462 |
| 5,702,999 | 12/1997 | Mazanec et al. | 501/152 |
| 5,712,220 | 1/1998 | Carolan et al. | 502/400 |
| 5,714,091 | 2/1998 | Mazanec et al. | 252/373 |
| 5,723,035 | 3/1998 | Mazanec et al. | 204/295 |
| 5,744,015 | 4/1998 | Mazanec et al. | 204/295 |
| 5,779,904 | 7/1998 | Ruderman et al. | 210/500.25 |
| 5,788,748 | 8/1998 | Mazanec et al. | 96/4 |
| 5,817,597 | 10/1998 | Carolan | 502/400 |
| 5,821,185 | 10/1998 | White et al. | 502/4 |
| 6,010,614 | 1/2000 | Keskar et al. | 205/765 |
| 6,056,807 | 5/2000 | Carolan et al. | 96/4 |

OTHER PUBLICATIONS

Teraoka, Y. et al. (1989) J. Ceram. Soc. Jpn. Inter. Ed. 97:458–462.

Teraoka, Y. et al. (1989) J. Ceram. Soc. Jpn. Inter. Ed. 97:523–529.

Kuchynka, D.J. et al. (1991) J. Electrochem. Soc. 138(5):1284–1299.

Sammells, A.F. and Cook, R.L. (1991), "Rational Selection of Advanced Solid Electrolytes for Intermediate Temperature Fuel Cells," presented at the Ceramic Conductors for Solid–State Electrochemical Devices Meeting, May 12–15, 1991, Snowbird, UT, (abstract only).

Schwartz, M. et al. (1993) J. Electrochem. Soc. 140(4):L62–L63 (Apr.).

Hawley's Condensed Chemical Dictionary. 13th Ed., revised by Richard J Lewis Sr., John Wiley & Sons, Inc. USA, ISBN 0–471–29205–2, p. 852, 1997.

METHODS FOR SEPARATING OXYGEN FROM OXYGEN-CONTAINING GASES

CROSS-REFERENCE TO RELATED PATENT APPLICATIONS

This application is a continuation-in-part of U.S. patent application Ser. No. 08/639,781, filed Apr. 29, 1996 now U.S. Pat. No. 6,033,632, which in turn is a continuation-in-part application of U.S. patent application Ser. No. 08/163,620 filed Dec. 8, 1993 now abandoned, both of which applications are incorporated by reference herein in their entirety to the extent not inconsistent with the disclosure herein.

STATEMENT OF GOVERNMENT SUPPORT

The research for this invention was supported by a grant from the U.S. Department of Energy, Grant No. DE-FG03-96ER82215. The United States government may have certain rights in this invention.

BACKGROUND OF THE INVENTION

Strong incentives exist for the development of efficient processes for the separation of oxygen from gas mixtures, such as air. Low-cost production would enhance the availability of pure oxygen for a variety of industrial applications including its use in high efficiency combustion processes. There is significant potential for the application of solid state catalytic membranes to oxygen separation. This technology is presently limited by the ceramic materials that are available. New ceramic materials that exhibit higher oxygen flux and improved mechanical and chemical stability in long term operation for use in membrane reactors are of significant interest in the art.

SUMMARY OF THE INVENTION

This invention relates to mixed metal oxide materials that are particularly useful for the manufacture of catalytic membranes for gas-phase oxygen separation processes. Oxygen-deficient oxides of this invention are derived from brownmillerite materials which have the general structure $A_2B_2O_5$. The materials of this invention maintain high oxygen anion conductivities at relatively low membrane operating conditions ranging from about 700° C. to 900° C. The metal elements at the B-site in the brownmillerite structure are selected to provide mixed ion- and electron-conducting materials and particularly to provide material that conduct oxygen anions and electrons. The materials of this invention have the general formula:

$$A_xA'_{x'}A''_{2-(x+x')}B_yB'_{y'}B''_{2-(y+y')}O_{5+z}$$

where:
- x and x' are greater than 0;
- y and y' are greater than 0;
- x+x' is less than or equal to 2;
- y+y' is less than or equal to 2;
- z is a number that makes the metal oxide charge neutral;
- A is an element selected from the lanthanide elements and yttrium;
- A' is an element selected from the Group 2 elements;
- B is an element selected from the group consisting of Al, Ga, In or mixtures thereof; and
- B' and B" are different elements and are independently selected from the group of elements Mg or the d-block transition elements.

The lanthanide metals include the f block lanthanide metals: La, Ce, Pr, Nd, Pm, Sm, Eu, Gd, Tb, Dy, Ho, Er, Tm, Yb, and Lu. Yttrium has properties similar to the f block lanthanide metals and is also included herein in the definition of lanthanide metals. A is preferably La or Gd, with La more preferred. Group 2 metal elements of the Periodic Table (also designated Group IIa) are Be, Mg, Ca, Sr, Ba, and Ra. The preferred Group 2 elements for the A' element of the materials of this invention are Ca, Sr and Ba and Sr is most preferred. The more preferred B elements are Ga and Al, with Ga more preferred. The d block transition elements include Sc, Ti, V, Cr, Mn, Fe, Co, Ni, Cu, and Zn. Preferred B' and B" elements are Mg, Fe and Co, with Fe and Co being more preferred as B' and B", respectively.

Mixed metal oxides in which B" and B" are Fe and Co are particularly preferred for membranes having high oxygen flux rates.

The value of z in the above formula depends upon the values of x, x', y and y' and the oxidation states of the A, A', A", B, B' and B" elements. The value of z is such that the mixed metal oxide material is charge neutral. In preferred materials, $0<z<1$.

Preferred stoichiometries for materials of this invention of the above formula are those in which x is about 0.1 to about 0.6, and x' is about 1.4 to about 1.9, and where in addition x+x' is about equal to 2. More preferred are materials in which x is about 0.3 to about 0.5 and x' is about 1.5 to about 1.7. Also preferred are those materials of the above formula where y is about 0.3 to about 0.9 and y' is about 0.70 to about 1.70. More preferred materials have y=about 0.6 and y'=about 1.0 to about 1.4. More preferred materials have y+y' equal to about 1.6 to about 2.0.

Electronically- and ionically-conducting membranes employed in the oxygen-separation reactors of this invention comprise mixed metal oxides of the above formula. Substantially gas-impermeable membranes having both electronic and ionic conductivity are formed by initially preparing mixed metal oxide powders by repeatedly calcining and milling the powders of individual metal oxides or the corresponding carbonates (or other metal precursors) in the desired stoichiometric ratios. The resulting mixed metal oxide is then pressed and sintered into dense membranes of various shapes, including disks and open-one-ended tubes. These membranes are then employed to construct catalytic membrane reactors, particularly for oxygen separation processes. The purity of the product oxygen produced in reactors of this invention, which can be stored or used in other chemical processes, is generally greater than about 90% and preferably greater than about 99%.

The presence of the mixed metal oxide of desired stoichiometry (as in the given formulas) in a repeatedly calcined and milled mixed metal oxide can be assessed by X-ray diffraction studies. Further, the presence of distinct phases of metal oxides or other metal species that may be present in the mixed metal oxides materials of this invention can be detected by X-ray diffraction techniques by the observation of peaks not assignable with the predominate mixed metal oxide of desired stoichiometry. The level of distinct phase material that can be detected depends upon the resolution and sensitivity of the X-ray diffractometer employed and upon the identity and number of the distinct phases present. It is believed that greater than about 4% by weight of another phase can be detected by the X-ray diffraction method employed (FIGS. 1–5)

A catalytic reactor of this invention comprises an oxidation zone and a reduction zone separated by the substantially gas-impermeable catalytic membrane which comprises the electronically and ionically conducting mixed metal oxides of the above formula. Once in the reactor, the membrane has an oxidation surface in contact with the oxidation zone of the reactor and a reduction surface in contact with the reduction zone of the reactor. Electronic conduction in the reactor is provided through the membrane material which is a mixed ion and electron conductor (i.e., conducts both electrons and ions, such as oxygen anions). A reactor also comprises passages for admission of oxygen-containing gas, such as air, into the reactor reduction zone and admission of an oxygen-depleted gas, inert gas or reduced gas into the oxidation zone of the reactor. A vacuum can alternatively be applied to the oxidation zone to remove separated oxygen from the oxidation zone. Oxygen removed in this way can be collected and concentrated, if desired. The reactor also has gas exit passages from the reduction and oxidation zones. A plurality of membrane reactors can be provided in series or in parallel (with respect to gas flow through the reactor) to form a multi-membrane reactor to enhance speed or efficiency of oxygen separation.

In operation for oxygen separation, an oxygen-containing gas, such as air, is introduced into the reduction zone of the reactor in contact with the reduction surface to the catalytic membrane. Oxygen is reduced to oxygen anion at the reduction surface and the anion is conducted through the membrane to the oxidation surface. At the oxidation surface, the oxygen anion is re-oxidized to oxygen which is released into the oxidation zone of the reactor. (Alternatively, oxygen anion can be employed to oxidize a reduced gas (e.g., a hydrocarbon gas) at the oxidation surface of the membrane.) Membrane materials of this invention conduct electrons as well as anions. (Membrane materials that also conduct electrons allow charge neutralization of the membrane during operation.) Gases in the reactor can be under ambient or atmospheric pressure or they can be placed under higher or lower pressure (e.g., a vacuum can be applied) than ambient conditions. During operation for oxygen separation, the membrane is heated typically at a temperature above about 700° C. and more typically from about 700° C. to about 1100° C. Preferred materials of this invention can be efficiently operated at temperatures that are generally lower than those currently used in the art, at from about 700° C. to about 900° C.

The oxidation surface, or the reduction surface or both surfaces (or parts of those surfaces) of the membrane can be coated with an oxidation catalyst or reduction catalyst, respectively, or both. A preferred catalyst for either or both surfaces of the membrane is $La_{0.8}Sr_{0.2}CoO_{3-z}$ where z is a number that makes the oxide charge neutral.

An oxygen flux of about 1 ml/min-cm$^2$ or higher can be obtained through a 1 mm- thick membrane at ambient pressure and at an operating temperature of about 900° C. These high flux rates can be maintained for long-term operation, e.g., up to about 700 h of operation.

Membrane materials as described herein can be employed in a method for oxygen separation from an oxygen-containing gas. In this method a reactor, as described above, is provided with a substantially gas-impermeable membrane which separates an oxidation and reduction zone. Oxygen is reduced at the reducing surface of the membrane, the resulting oxygen anions are then transported across the membrane to the reduction surface where oxygen anions are re-oxidized to form oxygen which is released into the oxidation zone for collection. This method can be employed to generate high purity oxygen (greater than about 90% purity) or very high purity oxygen (greater than about 99% purity) or to generate oxygen-enriched gases (e.g., oxygen in an inert gas).

DESCRIPTION OF THE INVENTION

Brownmillerites are generally referred to as having the formula $A_2B_2O_5$. Brownmillerite is considered to be derived from the perovskite structure by removal of ⅙ of the oxygen atoms. Solid state compositions based on the brownmillerite parent compound $Ba_2In_2O_5$ and useful in this invention are formed by introducing dopants or substitutents into the B-site of the lattice to lower the order-disorder phase transition. Higher oxygen anion conductivity is generally found to correlate with the disordered phase. Clear correlations exist between perovskite-related crystallographic and thermodynamic parameters with empirical parameters relating to the activation energy ($E_a$) for ionic transport. Lower values of $E_a$ favor higher ionic conduction. The derived expression for ionic conductivity is given by:

$$\sigma T = A exp(-\Delta Hm/KT)$$

where K is the Boltzman constant and $-\Delta H_m$ is the enthalpy of activation which is equivalent to $E_a$. This equation indicates that the overall ionic conductivity σ is a function of both an exponential term and a pre-exponential term. The pre-exponential term, A is given by:

$$A = (Z\lambda^2 e^2 / 6v_o K)C(1-C)v_o exp(\Delta Sm / K)$$

where $\Delta S_m$ is the activation entropy, C is the fraction of available sites occupied by mobile ions, A is the jump distance, Z is the number of jump directions $v_o$ is the molar volume and e is the electronic charge. The exponential term is related to the activation energy. These equations provide a rationale for dopant metal cation selection to improve ionic conduction. Dopants are selected to improve ionic conductivity by (i) optimizing vacancy concentration to maximize the pre-exponential term A, and (ii) decreasing activation energy to maximize the exponential term.

Membrane materials of this invention can be used for oxygen separation or oxygen enrichment, i.e., for decreasing the oxygen concentration in one gas stream and increasing or enriching the oxygen concentration in another gas stream. Oxygen-containing gas includes air, oxygen in nitrogen, oxygen in inert gases and contaminated oxygen. Oxygen from the oxygen-containing gas can be transferred in the reactors of this invention, in principle, to any gas in which it is desired to increase oxygen concentration, in particular an inert gas, nitrogen, a reduced gas (i.e., hydrocarbon-containing gas) can be introduced into the oxidation zone of the reactor. Alternatively, a vacuum or partial vacuum can be applied to the oxidation zone to collect separated oxygen. The separated oxygen can also be used to oxidize a reduced gas in the oxidation zone, i.e., to form oxygenated hydrocarbons.

This invention provides a method for separating oxygen from oxygen-containing gases and/or for oxygen enrichment of oxygen-deficient gases in which it is desired to increase the level of oxygen. The method employs a reactor having two chambers or zones (an oxidation zone and a reduction zone) separated by a substantially gas impermeable membrane. A substantially gas impermeable membrane may not be completely impermeable to small gaseous species such as hydrogen gas and may allow a low level of leakage of other gases. It is particularly important that the membrane be impermeable to gases from which oxygen is to be separated, such as nitrogen. Preferred membranes are formed without substantial cracking and gas leakage. The membrane is capable of transporting oxygen ions and also conducts electrons. The membrane is fabricated from an ion-conducting and electron-conducting mixed metal oxide of this invention having the formula given above.

The oxygen-containing gas is introduced into one chamber, the reduction zone, in contact with the reduction surface of the membrane. A differential oxygen partial pressure is established between the two chambers or zones, with oxygen partial pressure higher in the reduction zone. The differential partial pressure can be established by introducing an oxygen-deficient gas or a reduced gas into the oxidation zone which has a lower concentration of oxygen than in the oxygen-containing gas. The oxygen-deficient gas can be an inert gas such as helium. Alternatively, a partial or full vacuum can be applied to the oxidation zone to remove transported oxygen. Gas pressure in the zones may be ambient or higher or lower than ambient to achieve the desired differential oxygen partial pressure. The membrane is heated to a temperature that facilitates oxygen anion transport and also facilitates electron transport. Oxygen is transported across the membrane to enrich the oxygen content of the oxygen-deficient or reduced gas. Oxygen can be concentrated from the oxygen-enriched gas exiting the oxidation zone.

During operation the membranes of this invention are heated, typically to at least about 700° C. At lower temperatures, e.g., at 600° C., ionic conductivity of the 1 mm thick membrane is typically too low for practical operation.

The oxygen-separation reactors of this invention can be combined with other known methods for gas purification or gas separation to provide desired levels of purity in gas streams. The gas stream output of oxygen-separation reactors can be introduced as product gas streams for other reactors.

Mixed metal oxide materials useful for preparation of ionically- and electronically-conductive membranes include, among others:

| | |
|---|---|
| $A_xSr_{x'}B_yFe_yCo_{2-(y+y')}O_{5+z}$ | particularly where x is about 0.3 to about 0.5, x' is about 1.5 to about 1.7, y is 0.6, y' is between about 1.0 and 1.4, and where B is Ga or Al. |
| $La_xA'_{x'}B_yFe_yCo_{2-(y+y')}O_{5+z}$ | particularly where x is about 0.3 to about 0.5, x' is about 1.5 to about 1.7, y is 0.6, y' is between about 1.0 and 1.4, and where B is Ga or Al. |
| $La_xSr_{x'}B_yB'_yCo_{2-(y+y')}O_{5+z}$ | particularly where x is about 0.3 to about 0.5, x' is about 1.5 to about 1.7, y is 0.6, y' is between about 1.0 and 1.4, and where B is Ga or Al. |
| $La_xSr_{x'}B_yFe_yB''_{2-(y+y')}O_{5+z}$ | particularly where x is about 0.3 to about 0.5, x' is about 1.5 to about 1.7, y is 0.6, y' is between about 1.0 and 1.4, and where B is Ga or Al. |
| $La_xSr_{x'}B_yFe_yCo_{2-(y+y')}O_{5+z}$ | particularly where x is about 0.3 to about 0.5, x' is about 1.5 to about 1.7, y is 0.6, y' is between about 1.0 and 1.4, and where B is Ga or Al. |
| $La_{0.3}Sr_{1.7}Ga_{0.6}Fe_{1.0-m}Co_mO_{5+z}$ | where m is 0, 0.1, 0.15, 0.20, 0.25, 0.30, 0.35, and 0.40. |
| $La_{0.4}Sr_{1.6}Ga_{0.6}Fe_{1.0-m}Co_mO_{5+z}$ | where m is 0, 0.1, 0.15, 0.20, 0.25, 0.30, 0.35 and 0.40. |
| $La_{0.3}Sr_{1.7}Al_{0.6}Fe_{1.0-m}Co_mO_{5+z}$ | where m is 0, 0.1, 0.15, 0.20, 0.25, 0.30, 0.35 and 0.40. |
| $La_{0.4}Sr_{1.6}Al_{0.6}Fe_{1.0-m}Co_mO_{5+z}$ | where m is 0, 0.1, 0.15, 0.20, 0.25, 0.30, 0.35 and 0.40. |
| $La_{0.3}Sr_{1.7}Al_{0.6}Fe_{1.1}Co_{0.3}O_{5+z}$ | |
| $La_{0.4}Sr_{1.6}Al_{0.6}Fe_{1.2}Co_{0.2}O_{5+z}$ | |
| $La_{0.3}Sr_{1.7}Ga_{0.6}Fe_{1.4}O_{5+z}$ | |
| $La_{0.4}Sr_{1.6}Ga_{0.6}Fe_{1.4}O_{5+z}$ | |

Mixed metal oxide materials of this invention are substantially single-phase in that they are predominately (greater than about 90% by weight) comprised of a single-phase mixed metal oxide of the formula given above. The purity of the materials can be determined by X-ray diffraction methods which are believed to detect the presence of greater than about 4% by weight of other phases. The materials formed on mixing, calcining and milling individual metal oxide powders may contain minor amounts (up to about 10% by weight) of other metal oxides that form distinct phases, but which do not contribute significantly to the electronic and ionic conductivity of the material as a whole. These additional metal oxide phases may be formed unintentionally due to inaccuracies in the amounts of starting materials added because, for example, the starting materials may contain non-volatile impurities (e.g., starting metal oxides may contain low levels of metal carbonates) or volatile impurities (e.g., water) that alter the relative stoichiometries of component metals. Alternatively, additional metal oxide phases may be selectively introduced into the mixed metal oxide material by preparing off-stoichiometric mixtures of starting materials.

FIGS. 1–5 are X-ray diffractometer scans for several mixed metal oxides of the above formula $La_{0.4}Sr_{1.6}Ga_{0.6}Fe_{1.4}O_{5+z}$ (FIG. 1), $La_{0.3}Sr_{1.7}Ga_{0.6}Fe_{1.1}Co_{0.3}O_{5+z}$ (FIG. 2), $La_{0.3}Sr_{1.7}Al_{0.6}Fe_{1.1}Co_{0.3}O_{5+z}$ (FIG. 3), $La_{0.4}Sr_{1.6}Ga_{0.6}Fe_{1.2}Co_{0.2}O_{5+z}$ (FIG. 4), all of which were calcined, and $La_{0.4}Sr_{1.6}Al_{0.6}Fe_{1.2}Co_{0.2}O_{5+z}$ (FIG. 5), calcined and sintered (see Example 1). These scans were run on a Philips PW1830 X-ray generator with model 1050 goniometer for powder samples with a PW3710 control unit. The X-ray diffractometer scans indicate that the mixed metal oxide materials are substantially single-phase oxides of the desired stoichiometry containing small amounts of other oxide phases (less than about 10% by weight). The diffractometer employed can detect greater than about 4% by weight of other phases (as determined by adding increasing amounts of $SrAl_2O_4$ impurity). Small arrows on the scans indicate peaks believed to be indicative of second phases. The shoulder peak at about 32 is believed to be due to (Sr, La)$_2AlO_4$. The peaks between 28–30 are believed to be due to Sr(Fe, Al)$_2O_4$. The peaks at 34 and 41 have not as yet been identified.

In the mixed metal oxides of this invention, Group 2 elements Mg, Ca, Sr, Ba and Ra are believed to be in the 2+ oxidation state. Group 13 elements Al, Ga, and In are believed to be in the 3+ oxidation state. Lanthanides (including lanthanum and yttrium) are believed to be in the 3+ oxidation state. The transition metals in these materials are expected to be of mixed valence (i.e., a mixture of oxidation states) dependent upon the amount of oxygen present and the temperature.

Membranes useful in the oxygen separation method of this invention can be dense, substantially gas impermeable sintered materials in any desired shape, including membrane disks, open tubes, one-open-ended tubes, etc., that can be adapted to form a gas-tight seal between the two zones or chambers discussed above. The membrane can be sealed between the two zone or chambers with a gas tight seal employing approriately selected adhesive or sealant. Membranes can be formed by isostatic pressing of mixed metal oxide materials of this invention into dense substantially gas impermeable membranes. Alternatively, substantially gas-impermeable membranes can be formed by forming dense thin films of ionically and electronically conducting mixed metal oxide on porous substrate materials. Again these two component membranes (porous substrate and dense thin film) can have any desired shape including disks, tubes or one-open-ended tubes. Porous substrates (which allow passage of gas through the substrate) can include various metal oxide materials including metal-oxide stabilized zirconia, titania, alumina, magnesia, or silica, mixed metal oxide materials exhibiting ion and/or electronic conduction or metal alloys, particularly those that minimally react with oxygen. The substrate material should be inert to oxygen or facilitate the desired transport of oxygen. More preferred substrates are those that have a thermal expansion coefficient (over the operational temperatures of the reactor) that is matched to that of the mixed metal oxide ion/electron conducting material.

Thin films (about 10–300 $\mu$m thick) of the mixed metal oxides of this invention are formed on the porous substrate by a variety of techniques, including tape casting, dip coating or spin coating. A presently preferred two component membrane is prepared by forming dense thin films of the mixed metal oxides of this invention on a porous substrate formed from the same mixed metal oxide material.

The oxidation and reduction surfaces of the membranes of this invention can optionally be provided with an oxidation catalyst, a reduction catalyst or both. Oxidation and reduction catalysts can be selected from mixed metal oxides having the formula:

$$La_aA_{2-a}CO_{2-b}M_bO_{5+a/2+b/2}$$

where $0<b<0.4$, $0 \leq a \leq 1.6$, and where A is Ba, Sr, Ca or mixtures thereof and M is Fe, Cu or Ag or mixtures thereof.

A preferred oxidation/reduction catalyst is $La_{0.8}Sr_{0.2}CoO_{3-\delta}$ where $\delta$ is a number that makes the metal oxide charge neutral. Alternative catalysts include: $A_2CO_{2-b}M_bO_{5+b/2}$, where $0<b\leq0.2$, A is Ba, Sr, Ca or mixtures thereof and M is Fe, Ni, Cu, Ag or mixtures thereof; and metals dispersed onto ceramic material, particularly where the metal is Ag, Pd, Pt, Ir, Rh, Ru or mixtures thereof.

Catalysts can be deposited on the membrane surface by any known deposition process. A preferred process is the deposition of the catalysts on the sintered membrane surfaces by spray pyrolysis. Stoichiometric aqueous metal nitrate (or other metal precursor) solutions (having the stoichiometry of the desired metal oxide catalyst, for example, can be spray pyrolyzed by heating to about 700° C. using air as the spray pyrolysis propellant to avoid oxygen depletion during deposition. The pyrolyzed spray is uniformly deposited onto a heated (e.g., to 500° C.) sintered membrane, for example using an air brush device. Other solvents that do not interfere with deposition or react with the catalyst can be employed in the pyrolysis solution. Catalyst loading is varied by adjusting the concentration of the catalyst (or catalyst precursor) in the pyrolysis solution. Catalyst loading will typically be about 0.001 to about 0.1 g/cm$^2$ and preferably about 0.01 gr/cm$^2$.

EXAMPLES

Example 1

Preparation of Mixed Metal Oxides

Starting materials for preparation of mixed metal oxides were obtained from commercial sources and typically were employed without further purification. Higher purity mixed metal oxides can be obtained by initial removal of volatile impurities (e.g., $H_2O$, by heating starting materials under vacuum). For specific examples below, $La_2O_3$, $SrCO_3$, $Ga_2O_3$, $Al_2O_3$ and $Co_3O_4$ were obtained from Alfa/Aesar at purities indicated below. $Fe_2O_3$ was obtained from Aldrich.

The brownmillerite-derived ceramic materials of this invention were in general prepared from powders using standard solid state synthesis techniques.

A.  $La_{0.4}Sr_{1.6}Ga_{0.6}Fe_{1.2}Co_{0.2}O_{5+z}$

The following were combined:

16.34 parts by wt. of $La_2O_3$ (99.9% purity by weight on a rare earth metals basis)

59.23 parts by wt. of $SrCO_3$ (99% purity by weight, with <1% Ba)

14.10 parts by wt. of $Ga_2O_3$ (99.9% purity by weight on a metals basis)

24.03 parts by wt. of $Fe_2O_3$ (99+% purity by weight)

4.03 parts by wt. of $Co_3O_4$ (99.7% purity by weight on a metals basis)

in propanol (about 100 ml) and milled together for 18–24 hrs, after which the milled powder was dried and calcined in an alumina crucible (in air) for 6–12 h at 1175° C.–1250° C. The resulting product was subjected to grinding and sieving before calcining a second time at 1175° C.–1250° C. for 6–12 hrs. X-ray diffraction of calcined powder of $La_{0.4}Sr_{1.6}Ga_{0.6}Fe_{1.2}Co_{0.2}O_{5+z}$ shows these materials to be substantially single-phase, containing only small amounts of second phases (<10%), see FIG. 4.

To prepare dense membranes, the resulting powders were mixed with polyvinyl butyral binder and pressed and sintered in air at 1150° C.–1450° C. for 4–12 hours into dense disks and dense open-one-end tubes. Materials containing Ga are preferably sintered at lower temperatures in this range, up to about 1225 ° C. X-ray diffraction of sintered membranes show material to be substantially single-phase containing small amounts (less than about 10%) of second phases.

B. $La_{0.3}Sr_{1.7}Ga_{0.6}Fe_{1.1}Co_{0.3}O_{5+x}$ was prepared as in A above combining the following starting materials of the same purity and source:

12.40 parts by wt. of $La_2O_3$
63.70 parts by wt. of $SrCO_3$
14.27 parts by wt. of $Ga_2O_3$
22.29 parts by wt. of $Fe_2O_3$
6.11 parts by wt. of $Co_3O_4$ Membranes were prepared as in A above. An X-ray diffraction scan of calcined $La_{0.3}Sr_{1.7}Ga_{0.6}Fe_{1.1}Co_{0.3}O_{5+x}$ is provided in FIG. 2.

C. $La_{0.3}Sr_{1.7}Ga_{0.6}Fe_{1.1}Co_{0.35}O_{5+x}$ was prepared as in A above combining the following starting materials of the same purity and source:

16.289 parts by wt. of $La_2O_3$
59.044 parts by wt. of $SrCO_3$
14.056 parts by wt. of $Ga_2O_3$
20.597 parts by wt. of $Fe_2O_3$
7.022 parts by wt. of $Co_3O_4$ Membranes were prepared as in A above.

D. $La_{0.4}Sr_{1.6}Al_{0.6}Fe_{1.2}Co_{0.2}O_{5+x}$ was prepared as in A above combining the following starting materials of the same purity and source unless otherwise indicated:

17.43 parts by wt. of $La_2O_3$
63.17 parts by wt. of $SrCO_3$
8.18 parts by wt. of $\alpha Al_2O_3$ (alpha-alumina)(99.9% purity by weight on a metals basis)
25.62 parts by wt. of $Fe_2O_3$
4.29 parts by wt. of $Co_3O_4$ Dense membranes were prepared as described above in A with the exception that materials containing Al are preferably sintered at temperatures at the higher end of the range given, i.e. at about 1300° C. or above and preferably at 1400° C. to 1420° C. An X-ray diffraction scan of sintered material is provided in FIG. 5.

Example 2

O₂ Flux or Permeation Measurements

An open-one-end membrane tube (about 1.0 mm m thick) prepared from $La_{0.3}Sr_{1.7}Ga_{0.6}Fe_{1.1}Co_{0.35}O_{5+x}$ as described in Example 1 C was incorporated into a membrane reactor with a Pyrex seal used to isolate the air from the permeate chamber. A slurry of $La_{0.8}Sr_{0.2}CoO_{3-x}$ (in 1, 2-butanediol) was applied on both the anode (oxidation) and cathode (reduction) sides of the membrane to serve as both oxidation and reduction catalysts. Gas flows on both sides of the membrane were under ambient pressure. Air flow on the cathode side of the reactor was held at 600 ml/min, and the He flow on the anode side was fixed at 400 ml/min. Under these conditions, an oxygen flux of 0.9 ml/min-cm² was maintained at 900° C. for 700 h of operation. This is equivalent to an oxygen ion conductivity of 0.7 S/cm. An activation energy of less than 0.5eV was calculated from temperature dependent measurements. Oxygen conductivity is calculated from oxygen flux (or permeation) according to the equation:

$$\sigma ion(S/cm) = 5.7 \times 10^3 (J^* d/T)[\log(P'/P'')]^{-1}$$

where

J is the oxygen permeation in ml/min-Cm³,
d is membrane thickness in cm,
T is temperature in K,
P' and P" are the oxygen partial pressures on opposite sides of the membrane.

See, Y. Teraoka, et al. (1988) Mater. Res. Bull. 23:51.

Table 1 provides oxygen permeation data for dense membranes (about 0.8–1.0 mm thick) prepared by isostatic pressing of mixed metal oxide materials of this invention. Membranes were prepared as open-one-ended tubes. In these experiments, the partial pressure of oxygen on the cathode side was 0.21 atm (O₂ in air) and on the anode side was maintained at 0.02 atm. He flow on the anode side was adjusted to maintain the constant oxygen partial pressure of 0.02 atm. In both cases gas flows were at ambient pressure. Maintenance of the constant partial pressures of oxygen on either side of the membrane allows comparison of data among different membrane materials.

Figure 1:
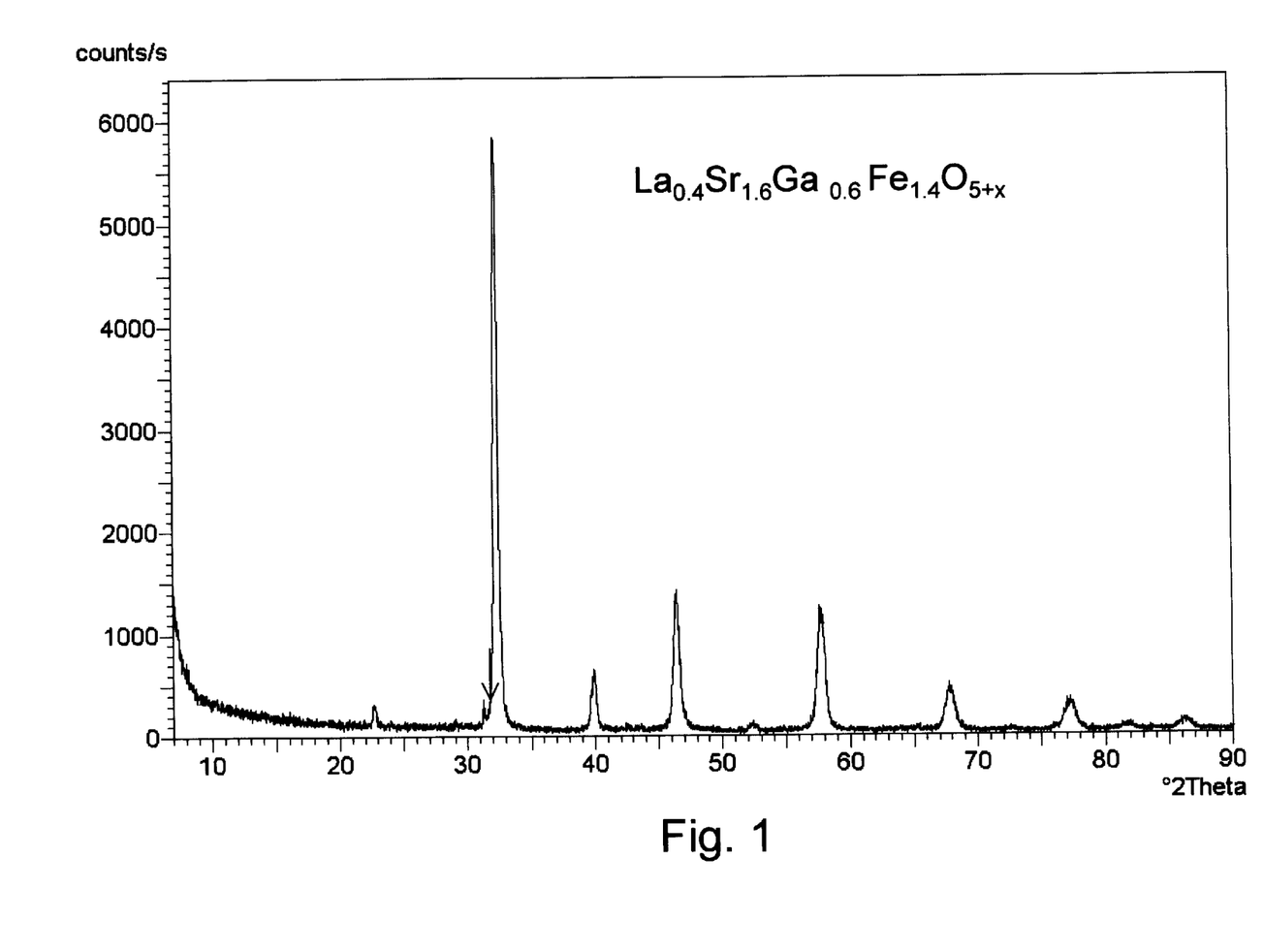
FIG. 1 is an x-ray diffractometer scan for calcined mixed metal oxide having the formula $La_{0.4}Sr_{1.6}Ga_{0.6}Fe_{1.4}O5_{+z}$.
Figure 2:
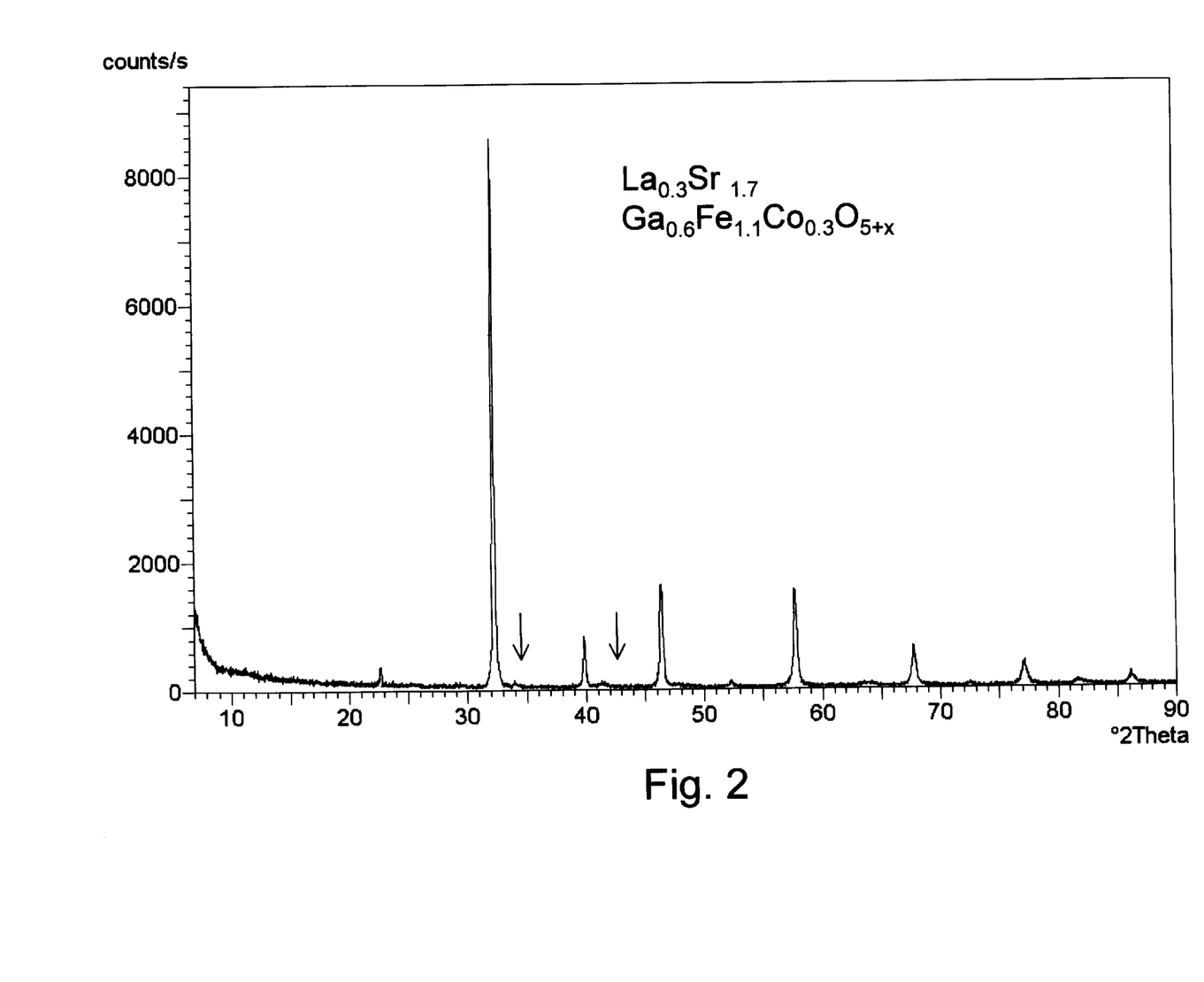
FIG. 2 is an x-ray diffractometer scan for calcined mixed metal oxide having the formula $La_{0.3}Sr_{1.7}Ga_{0.6}Fe_{1.1}Co_{0.3}O_{5+z}$.
Figure 3:
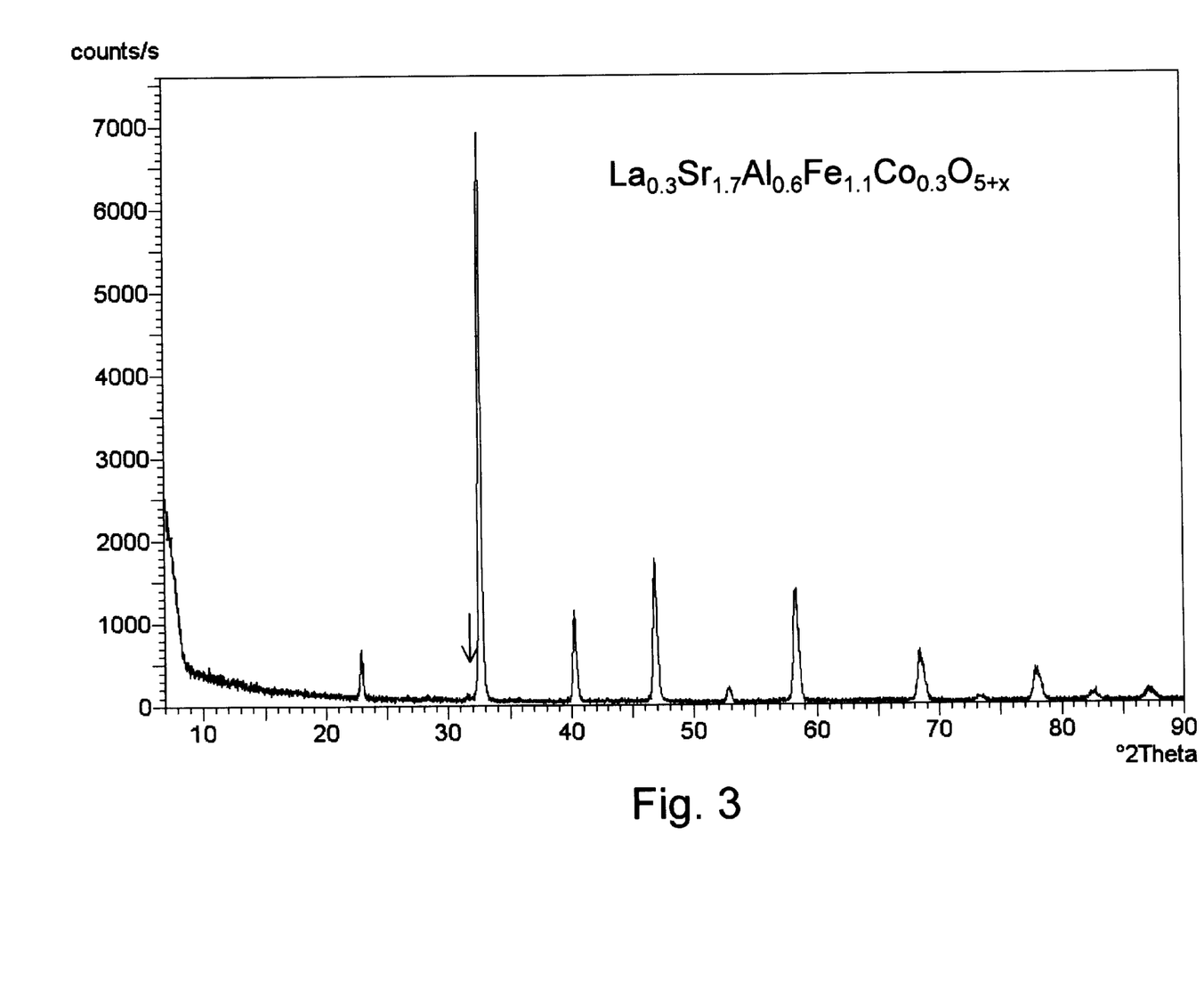
FIG. 3 is an x-ray diffractometer scan for calcined mixed metal oxides having the formula $La_{0.4}Sr_{1.7}Al_{0.6}Fe_{1.1}Co_{0.3}O_{5+z}$.
Figure 4:
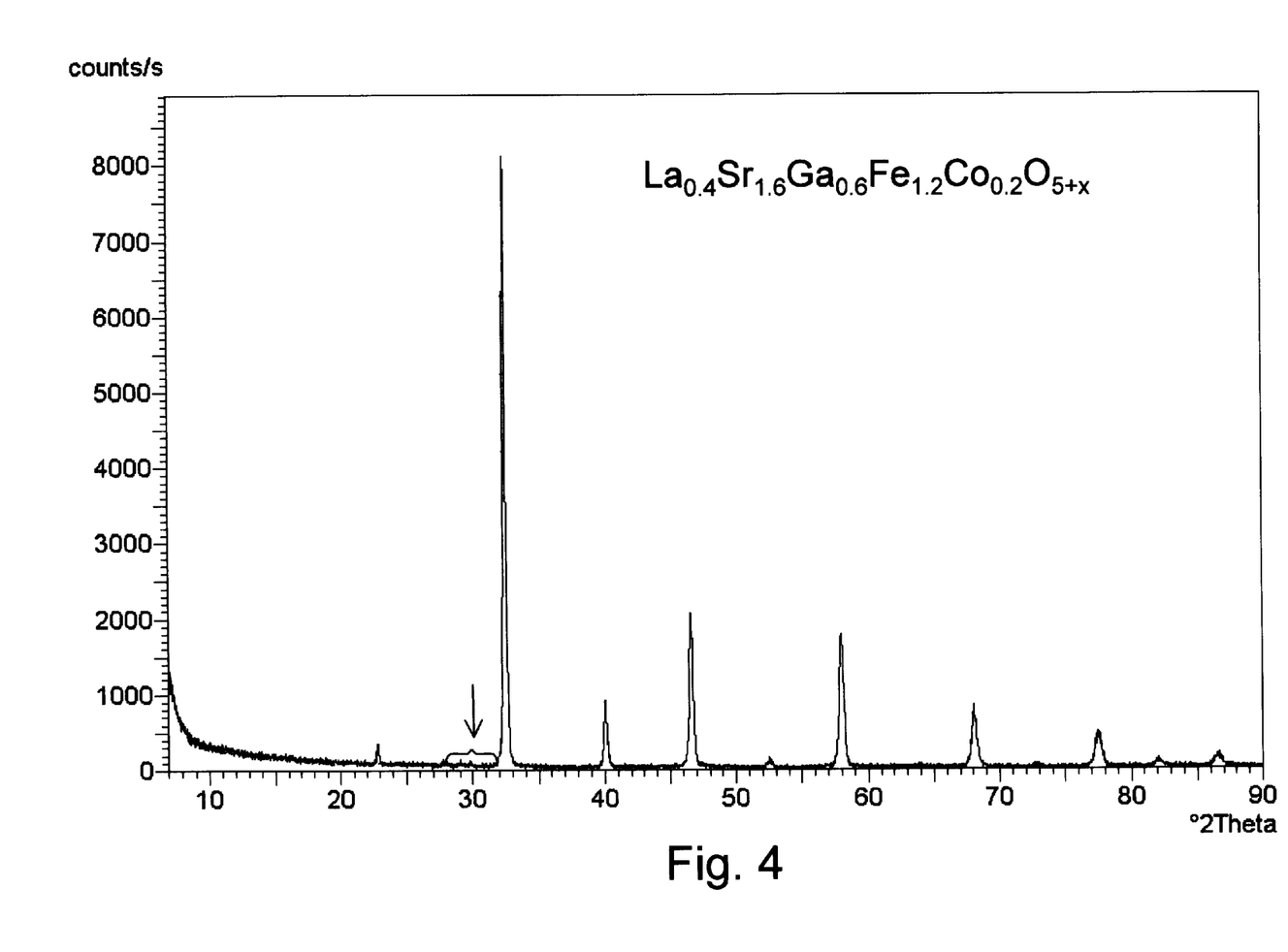
FIG. 4 is an x-ray diffractometer scan for calcined mixed metal oxides of formula $La_{0.4}Sr_{1.6}Ga_{0.6}Fe_{1.2}Co_{0.2}O_{5+z}$.
Figure 5:
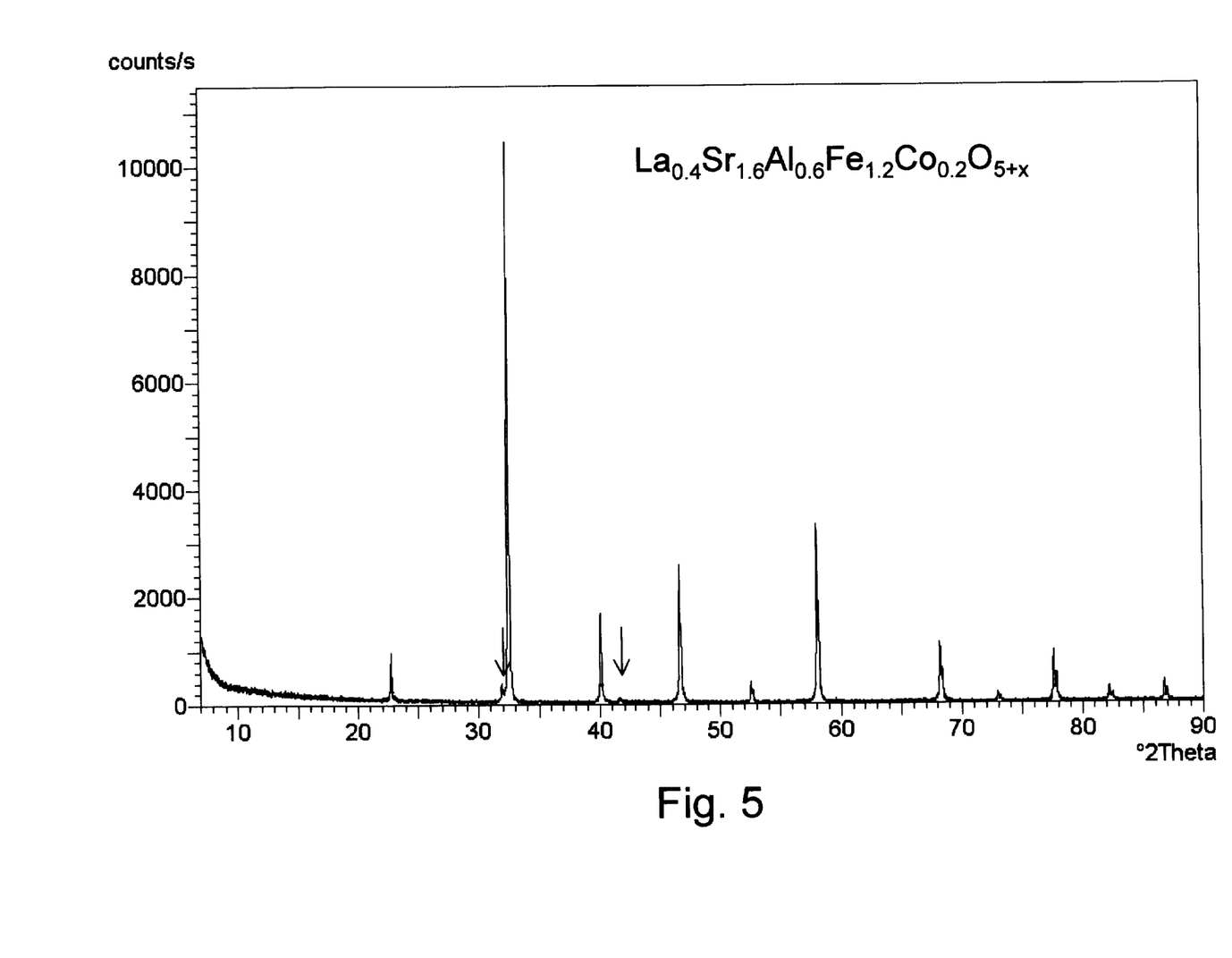
FIG. 5 is an x-ray diffractometer scan for calcined and sintered mixed metal oxides of formula $La_{0.4}Sr_{1.6}Al_{0.6}Fe_{1.2}Co_{0.2}O_{5+z}$.
Figure 6:
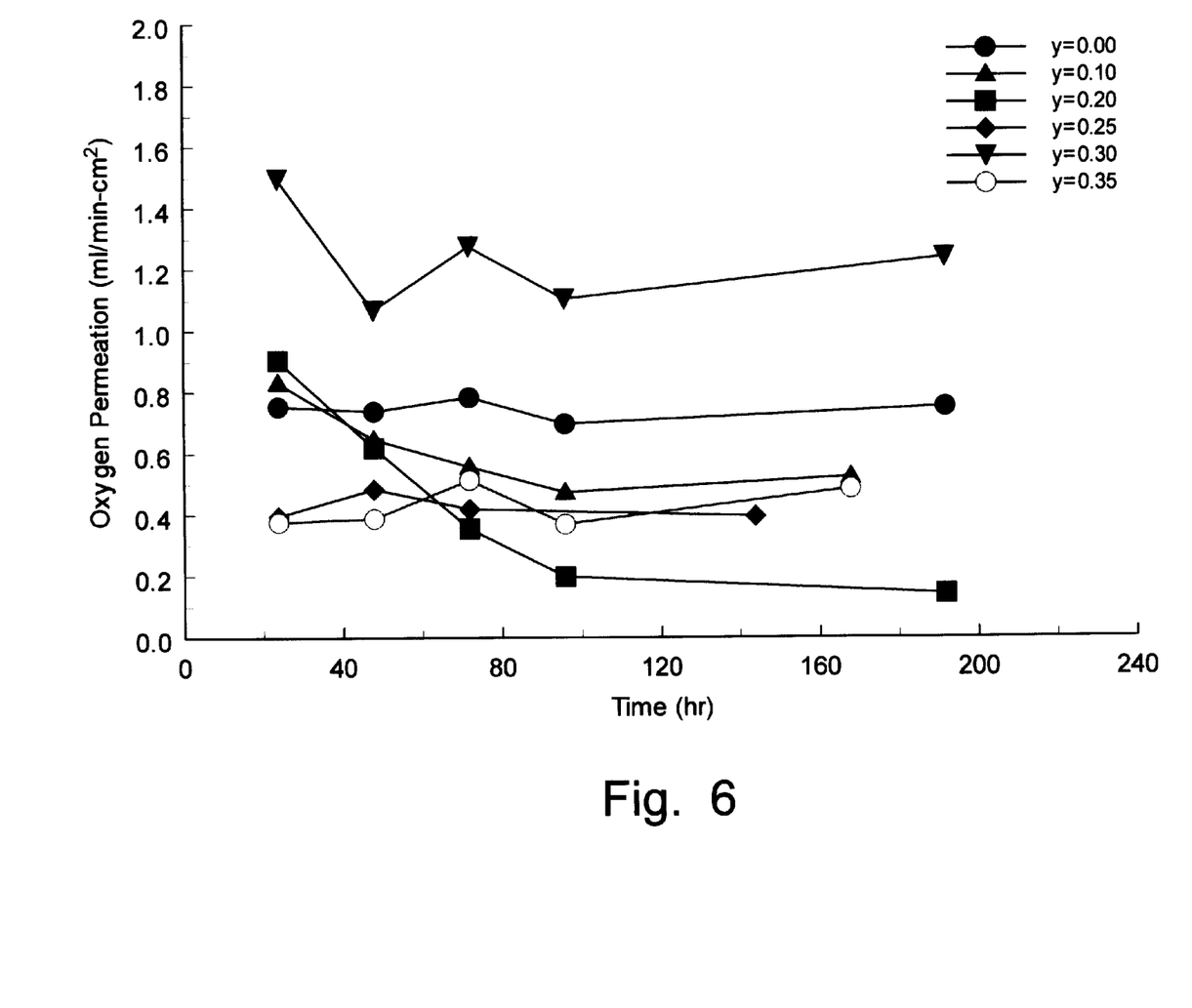
FIG. 6 is a graph of oxygen permeation (ml/min-cm$^2$) at 900° C. as a function of time for compounds of composition $Sr_{1.7}La_{0.3}Ga_{0.6}Fe_{1.4-y}Co_yO_{5+z}$ where $0.0 \leq y \leq 0.4$. Closed circles (—●—) are the results with the composition where y=0, closed triangles (—▲—) are results where y=0.10, closed squares (—■—) are the results where y=0.20, closed diamonds (—♦—) are the results where y=0.25, closed inverted triangles (—▼—) are the results where y=0.30 and open circles (—○—) are the results where y=0.35.
Figure 7:
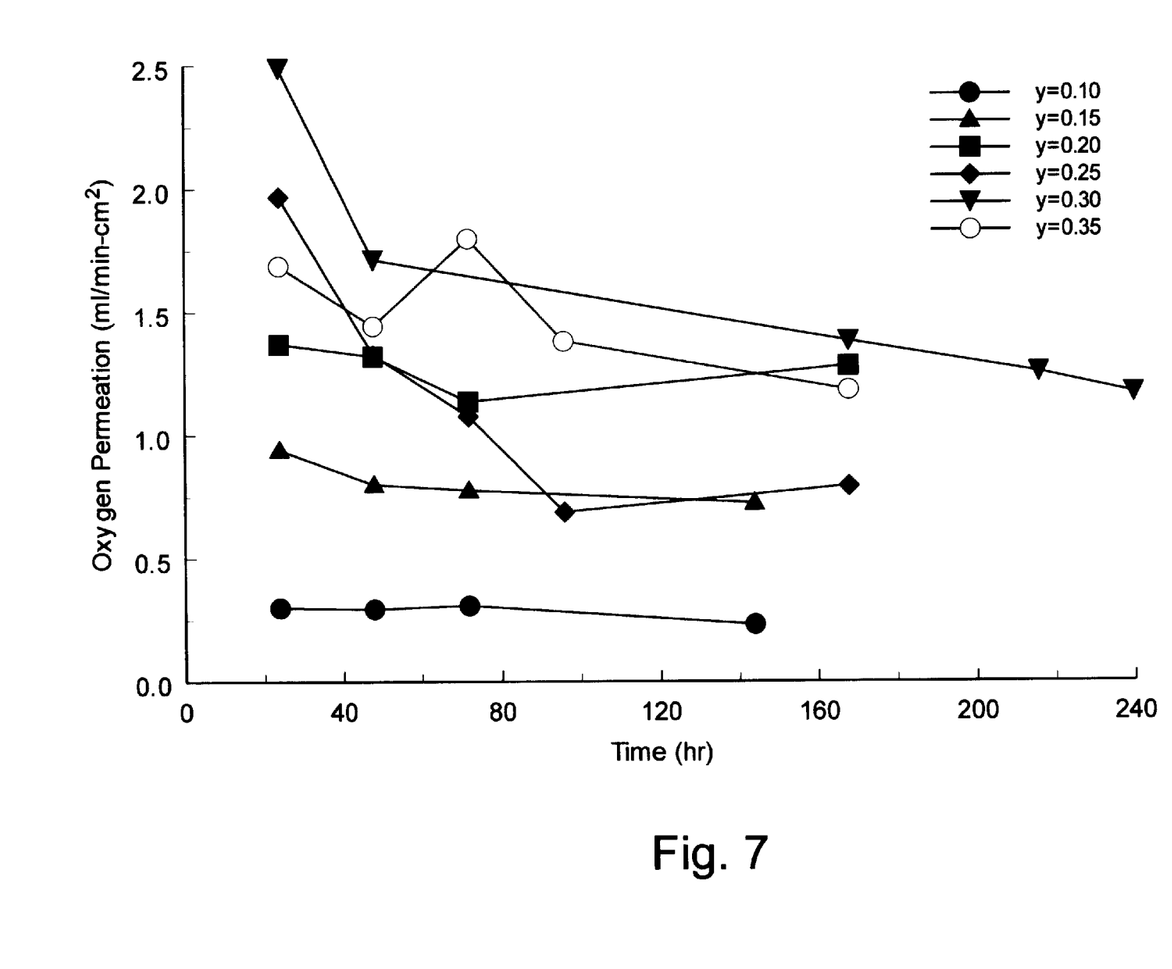
FIG. 7 is a graph of oxygen permeation at 900° C. (ml/min-cm$^2$) as a function of time for compounds of composition $Sr_{1.6}La_{0.4}Ga_{0.6}Fe_{1.4-y}Co_yO_{5+z}$ where 0.0<y<0.4. Closed circles (—●—) are the results with the composition where y=0.10, closed triangles (—▲—) are results where y-0.15, closed squares (—■—) are the results where y=0.20, closed diamonds (—♦—) are the results where y=0.25, closed inverted triangles (—▼—) are the results where y=0.30 and open circles (—○—) are the results where y=0.35.

Table 1 also lists ion conductivities which are calculated using the equation above. The values of oxygen permeation and calculated conductivity given in the table at those measured after operation in a reactor for the time listed in Table 1. FIGS. 6 and 7 are graphs comparing oxygen flux or permeation (ml/min-cm²) as a function of time at 900° C. for several different membrane materials. FIG. 6 compares oxygen flux as a function of time using membranes prepared from $La_{0.3}Sr_{1.7}Ga_{0.6}Fe_{1.4-y}Co_yO_{5+z}$ where $0.0 \leq y < 0.4$, indicating that the amount of Co is varied. The preferred material over time based on this data is that where y=0.30. FIG. 7 compares oxygen flux as a function of time using membranes prepared from $La_{0.4}Sr_{1.6}Ga_{0.6}Fe_{1.4-y}Co_yO_{5+z}$ where $0.0 < y < 0.4$, indicating that the amount of Co is varied. The preferred material over time based on these data is that where y=0.20.

Example 3

Preparation of Thin Films

Membranes for oxygen separation reactors can be prepared by coating a substrate with a thin film (about 10–about 300 μm thick) of a mixed metal oxide material of this invention. In particular a porous substrate material can be coated with a dense thin film of these materials to provide a substantially gas impermeable membrane. In general, thin films are applied to selected substrates by methods known in the art, including tape casting, dip coating or spin coating. Presently preferred thin film-coated membranes are prepared using a porous membrane as a substrate where the porous membrane is made of a mixed metal oxide of the same or similar composition to the ion and electron conduction mixed metal oxide that will comprise the thin film. Use of a substrate that has the same or a similar (preferably within about 20% of) thermal expansion coefficient as the thin film material will minimize or avoid cracking of the film and/or membrane on heating. Furthermore, use of a chemically similar material for both the substrate and thin film will minimize undesired reactivity of the two materials with each other and undesired reactivity of the substrate with gases in the reactor. Porous membranes of the mixed metal oxides of this invention can be prepared in a variety of ways, for example, by combining the metal oxide with an organic filler (up to about 20% by weight), such as cellulose or starch particles of a selected size range 9 e.g. about 20 μm particles), shaping or pressing the desired membrane and sintering. The organic filler is destroyed and removed on sintering leaving desired pores of a selected size in the membrane. Thin films are preferably uniformly thick and crack-free on firing. Uniform deposition of films can for example be obtained by use of colloidal suspensions of the metal oxide in a selected solvent. The suspension is applied to the porous substrate by conventional coating or casting methods to give a uniform deposition which on firing gives a film of uniform thickness. An alternative method for applying thin films is the use of co-polymeric precursors which comprise metal oxide incorporated into the polymer. Flat membranes or tubular membranes can be prepared having dense thin films of the metal oxide mixed ion and electron conductors of this invention.

Those of ordinary skill in the art will appreciate that methods, materials, reagents, solvents, membrane structures and reactors other than those specifically described herein can be employed or adapted without undue experimentation to the practice of this invention. All such variants in methods, materials, reagents, solvents, structures and reactors that are known in the art and that can be so adapted or employed are encompassed by this invention.

said oxidation zone where said oxygen anions are oxidized forming oxygen which is thereby separated from said oxygen-containing gas.

2. The method of claim 1 wherein in said mixed metal oxide B is Ga.

3. The method of claim 1 wherein in said mixed metal oxide B' is Fe.

4. The method of claim 3 wherein B' is Co.

5. The method of claim 1 wherein in said mixed metal oxide B" is Co.

6. The method of claim 1 wherein in said mixed metal oxide A is La.

7. The method of claim 1 wherein in said mixed metal oxide A' is Sr.

TABLE 1

| Membrane Compound | total time (hr) | J (ml/min-cm$^2$) Temperature (° C.) | | | | | $\sigma_{ion}$ (S/cm) Temperature (° C.) | | | | |
|---|---|---|---|---|---|---|---|---|---|---|---|
| | | 750 | 800 | 850 | 900 | $E_a$ | 750 | 800 | 850 | 900 | $E_a$ |
| $Sr_{1.6}La_{0.4}Ga_{0.6}Fe_{1.3}Co_{0.1}O_{5+z}$ | 144 | 0.092 | 0.138 | 0.207 | 0.231 | 0.66 | 0.033 | 0.053 | 0.088 | 0.098 | 0.79 |
| $Sr_{1.6}La_{0.4}Ga_{0.6}Fe_{1.25}Co_{0.15}O_{5+z}$ | 144 | 0.327 | 0.447 | 0.600 | 0.725 | 0.56 | 0.140 | 0.201 | 0.285 | 0.352 | 0.64 |
| $Sr_{1.6}La_{0.4}Ga_{0.6}Fe_{1.2}Co_{0.2}O_{5+z}$ | 168 | 0.529 | 0.778 | 1.023 | 1.282 | 0.61 | 0.213 | 0.339 | 0.470 | 0.616 | 0.73 |
| $Sr_{1.6}La_{0.4}Ga_{0.6}Fe_{1.15}Co_{0.25}O_{5+z}$ | 168 | 0.201 | 0.289 | 0.560 | 0.793 | 0.99 | 0.057 | 0.084 | 0.185 | 0.277 | 1.14 |
| $Sr_{1.6}La_{0.4}Ga_{0.6}Fe_{1.1}Co_{0.3}O_{5+z}$ | 360 | 0.297 | 0.456 | 0.629 | 0.882 | 0.74 | 0.098 | 0.160 | 0.229 | 0.340 | 0.84 |
| $Sr_{1.6}La_{0.4}Ga_{0.6}Fe_{1.05}Co_{0.35}O_{5+z}$ | 168 | 0.226 | 0.355 | 0.700 | 1.184 | 1.17 | 0.069 | 0.114 | 0.261 | 0.507 | 1.40 |
| $Sr_{1.7}La_{0.3}Ga_{0.6}Fe_{1.3}Co_{0.1}O_{5+z}$ | 168 | 0.164 | 0.246 | 0.363 | 0.523 | 0.80 | 0.061 | 0.094 | 0.147 | 0.224 | 0.90 |
| $Sr_{1.7}La_{0.3}Ga_{0.6}Fe_{1.2}Co_{0.2}O_{5+z}$ | 192 | 0.035 | 0.059 | 0.074 | 0.141 | 0.91 | 0.008 | 0.014 | 0.018 | 0.038 | 1.00 |
| $Sr_{1.7}La_{0.3}Ga_{0.6}Fe_{1.15}Co_{0.25}O_{5+z}$ | 144 | 0.124 | 0.188 | 0.286 | 0.394 | 0.81 | 0.054 | 0.086 | 0.142 | 0.212 | 0.95 |
| $Sr_{1.7}La_{0.3}Ga_{0.6}Fe_{1.1}Co_{0.3}O_{5+z}$ | 192 | 0.298 | 0.508 | 0.888 | 1.239 | 1.00 | 0.101 | 0.190 | 0.379 | 0.570 | 1.22 |
| $Sr_{1.7}La_{0.3}Ga_{0.6}Fe_{1.05}Co_{0.35}O_{5+z}$ | 168 | 0.146 | 0.228 | 0.325 | 0.484 | 0.82 | 0.059 | 0.101 | 0.156 | 0.266 | 1.02 |
| $Sr_{1.7}La_{0.3}Ga_{0.6}Fe_{1.4}O_{5+z}$ | 192 | 0.343 | 0.487 | 0.625 | 0.751 | 0.54 | 0.143 | 0.217 | 0.291 | 0.361 | 0.64 |

We claim:

1. A method for separating oxygen from an oxygen-containing gas which comprises the steps of:
   (a) providing an oxidation zone and a reduction zone separated from one another by a substantially gas-impermeable membrane having a reduction surface in contact with said reduction zone and an oxidation surface in contact with said oxidation zone said membrane prepared from a mixed conducting metal oxide having the formula:

$$A_xA'_{x'}A''_{2-(x+x')}B_yB'_{y'}B''_{2-(y+y')}O_{5+z}$$

where:
   x and x' are greater than 0;
   y and y' are greater than 0;
   x+x' is less than or equal to 2;
   y+y' is less than or equal to 2;
   z is a number selected to make the metal oxide charge neutral;
   A is an element selected from the f block lanthanide elements;
   A' is an element selected from Be, Mg, Ca, Sr, Ba and Ra;
   A" is an element selected from the f block lanthanides or the Be, Mg, Ca, Sr, or Ba;
   B is an element selected from the group consisting of Al, Ga, In or mixtures thereof; and
   B' and B" are different elements and are independently selected from the group of elements Mg or the d-block transition elements;
   (b) passing said oxygen-containing gas in contact with said membrane in said reduction zone to reduce oxygen therein and generate oxygen anions in said membrane material said oxygen anions thereafter transported to 8. The method of claim 1 wherein in said mixed metal oxide A" is Ba or Ce.

9. The method of claim 1 wherein in said mixed metal oxide A is La, A' is Sr, B' is Fe and B" is Co.

10. The method of claim 9 wherein in said mixed metal oxide x+x' is equal to 2.

11. The method of claim 9 wherein x is about 0.3 to about 0.5.

12. The method of claim 9 wherein y is about 0.6.

13. The method of claim 1 wherein x is about 0.3 to about 0.5.

14. The method of claim 1 wherein y is about 0.6.

15. The method of claim 1 wherein said oxidation zone contains an inert gas and said separated oxygen is entrained in said inert gas.

16. The method of claim 1 wherein said oxidation surface of said membrane is coated with an oxidation catalyst.

17. The method of claim 1 wherein said reduction surface of said membrane is coated with a reduction catalyst.

18. The method of claim 1 wherein $La_{0.8}Sr_{0.2}CoO_{3-x}$ is coated on said oxidation surface, said reduction surface or both as an oxidation catalyst, reduction catalyst or both.

19. The method of claim 1 wherein said oxygen-containing gas is air.

20. The method of claim 1 wherein the membrane is prepared from a mixed conducting metal oxide selected from those oxides having the formulas $La_{0.3}Sr_{1.7}Ga_{0.6}Fe_{1.0-m}Co_mO_{5+z}$, $La_{0.4}Sr_{1.6}Ga_{0.6}Fe_{1.0-m}Co_mO_{5+z}$, $La_{0.3}Sr_{1.7}Al_{0.6}Fe_{1.0-m}Co_mO_{5+z}$, $La_{0.4}Sr_{1.6}Al_{0.6}Fe_{1.0-m}Co_mO_{5+z}$ where m is 0.1, 0.15, 0.20, 0.25, 0.30, 0.35 or 0.40.

21. The method of claim 1 where the membrane is prepared from $La_{0.3}Sr_{1.7}Al_{0.6}Fe_{1.1}Co_{0.3}O_{5+z}$ or $La_{0.4}Sr_{1.6}Ga_{0.6}Fe_{1.2}Co_{0.2}O_{5+z}$.

22. The method of claim 1 wherein the gas impermeable membrane is a porous membrane coated with a thin film having thickness from about 10 to about 300 microns wherein both the porous membrane and the thin film are made from the same mixed metal oxide.

23. The method of claim 1 wherein the membrane is a gas impermeable disk or a gas impermeable open-one-end tube.

24. The method of claim 1 wherein the gas impermeable membrane is formed by mixing a mixed metal oxide powder with a binder, pressing the mixed metal oxide/binder mixture into a disk or tube and sintering the disk or tube in air.

25. A method for separating oxygen from an oxygen-containing gas which is prepared from the steps of:

(a) providing an oxidation zone and a reduction zone separated from one another by a substantially gas-impermeable membrane having a reduction surface in contact with said reduction zone and an oxidation surface in contact with said oxidation zone said membrane prepared from a mixed conducting metal oxide having the formula:

$$A_x A'_{x'} A''_{2-(x+x')} B_y B'_{y'} B''_{2-(y+y')} O_{5+z}$$

where:
x and x' are greater than 0;
y and y' are greater than 0;
x+x' is less than or equal to 2;
y+y' is less than or equal to 2;

z is a number selected to make the metal oxide charge neutral;

A is an element selected from the f block lanthanide elements;

A' is an element selected from the Be, Mg, Ca, Sr, Ba and Ra;

A" is an element selected from the f block lanthanides or Be, Mg, Ca, Sr, Ba;

B is an element selected from the group consisting of Al, Ga, In or mixtures thereof; and B' and B" are different elements and are independently selected from the group of elements Mg or the d-block transition elements;

(b) passing said oxygen-containing gas in contact with said membrane in said reduction zone to reduce oxygen therein and generate oxygen anions in said membrane material said oxygen anions thereafter transported to said oxidation zone where said oxygen anions are oxidized forming oxygen which is thereby separated from said oxygen-containing gas.

26. The method of claim 25 wherein the membrane comprises up to about 10% by weight of a second metal oxide phase.

* * * * *

UNITED STATES PATENT AND TRADEMARK OFFICE
CERTIFICATE OF CORRECTION

PATENT NO. : 6,165,431
DATED : December 26, 2000
INVENTOR(S) : Mackay et al.

It is certified that error appears in the above-identified patent and that said Letters Patent is hereby corrected as shown below:

Column 7,
Line 66, please replace "$LaCO_{2-b}M_bO_{5+b/2}$" with -- $LaCo_{2-b}M_bO_{5+b/2}$ --.

Column 8,
Line 20, please replace "0.01 gr/cm$^2$" with -- 0.01 g/cm2 --.

Column 9,
Line 65, please replace "ml/min-Cm$^3$" with -- ml/min-cm$^3$ --.

Column 11, claim 1,
Line 58, please replace "or the Be," with -- or Be, --.

Column 14, claim 25,
Line 5, please replace "from the Be," with -- from Be, --.

Signed and Sealed this

Thirteenth Day of November, 2001

Attest:

NICHOLAS P. GODICI
Attesting Officer    Acting Director of the United States Patent and Trademark Office